United States Patent
Batts (10) Patent No.: US 12,430,310 B2
(45) Date of Patent: *Sep. 30, 2025

(54) CONTAINER-IMAGE REPRODUCTION AND DEBUGGING

(71) Applicant: RED HAT, INC., Raleigh, NC (US)

(72) Inventor: Vincent Batts, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 668 days.

This patent is subject to a terminal disclaimer.

(21) Appl. No.: 17/227,826

(22) Filed: Apr. 12, 2021

(65) Prior Publication Data

US 2021/0232562 A1 Jul. 29, 2021

Related U.S. Application Data

(63) Continuation of application No. 16/111,919, filed on Aug. 24, 2018, now Pat. No. 11,003,650.

(51) Int. Cl.
*G06F 16/22* (2019.01)
*G06F 21/60* (2013.01)

(52) U.S. Cl.
CPC ........ *G06F 16/2282* (2019.01); *G06F 21/602* (2013.01)

(58) Field of Classification Search
CPC ........................ G06F 16/2282; G06F 21/602
USPC ........................ 707/E17.005, 693, 695, 803
See application file for complete search history.

(56) References Cited

U.S. PATENT DOCUMENTS

| | | | |
|---|---|---|---|
| 7,904,570 B1 | 3/2011 | Kroupa | |
| 8,347,263 B1 | 1/2013 | Offer | |
| 9,367,305 B1 | 6/2016 | Kumar et al. | |
| 9,442,717 B2 | 9/2016 | Rohan | |
| 9,983,891 B1 | 5/2018 | Chrisensen | |
| 2017/0243233 A1* | 8/2017 | Land ................. | G06V 10/751 |
| 2018/0054314 A1 | 2/2018 | Edwards | |
| 2020/0183766 A1* | 6/2020 | Kumar-Mayernik ................. H04L 9/3247 |

OTHER PUBLICATIONS

Beaupre, A., "Securing the Container Image Supply Chain," May 17, 2018, https://lwn.net/Articles/754443/.

(Continued)

*Primary Examiner* — Hau H Hoang
(74) *Attorney, Agent, or Firm* — Kilpatrick Townsend & Stockton LLP (57) ABSTRACT

Some examples of the present disclosure relate to container-image replication. One example includes a computing device that can generate a container image. The container image can include metadata that is consumable by a container engine for deploying a container with settings specified in the metadata. The computing device can also generate provenance data indicating at least one aspect related to the generation of the container image. The computing device can modify the metadata in the container image to include an indicator of the provenance data. The computing device can then store the container image and the provenance data in one or more repositories accessible to a client device. This may enable the client device to reproduce the container image at a future point in time.

20 Claims, 4 Drawing Sheets

(56) References Cited

OTHER PUBLICATIONS

Dahyabhai, N., et al., "Introducing Buildah: A Tool for Building OCI Container Images," https://blog.openshift.com/wp-content/uploads/Copy-of-buildah-Tech-talk.pdf.

McCarty, S., "A Practical Introduction to Container Terminology," Red Hat, 2018, https://developers.redhat.com/blog/2018/02/22/container-terminology-practical-introduction/.

* cited by examiner

FIG. 1

```
{
  "schemaVersion": 2,
  "config": {
    "mediaType": "application/vnd.oci.image.config.v1+json",
    "size": 7023,
    "digest": "sha256:b5b2b2c507a0944348e0303114d8d93aaaa081732b86451d9bce1f432a537bc7"
  },
  "layers": [
    {
      "mediaType": "application/vnd.oci.image.layer.v1.tar+gzip",
      "size": 32654,
      "digest": "sha256:9834876dcfb05cb167a5c24953eba58c4ac89b1adf57f28f2f9d09af107ee8f0"
    },
    {
      "mediaType": "application/vnd.oci.image.layer.v1.tar+gzip",
      "size": 16724,
      "digest": "sha256:3c3a4604a545cdc127456d94e421cd355bca5b528f4a9c1905b15da2eb4a4c6b"
    },
    {
      "mediaType": "application/x-container.provenance;url=http://www.github.com/project1/provdata/",
    }
  ],
  "annotations": {
    "com.example.key1": "value1",
    "com.example.DEBUGINFO": "ExampleDebugInformation",
  }
}
```

CONTAINER-IMAGE REPRODUCTION AND DEBUGGING

REFERENCE TO RELATED APPLICATION

This is a continuation of co-pending U.S. patent application Ser. No. 16/111,919, titled "Container-Image Reproduction and Debugging" and filed on Aug. 24, 2018, the entirety of which is hereby incorporated by reference herein.

TECHNICAL FIELD

The present disclosure relates generally to file management and reproduction. More specifically, but not by way of limitation, this disclosure relates to container-image reproduction and debugging.

BACKGROUND

Computers use operating systems to manage system processes and resources. Some operating systems, such as the Linux operating system, include a low-level software component for managing system processes and resources. The low-level software component is called a "kernel." The kernel can provide features, such as namespaces and cgroups, for isolating processes and resources from one another. These features can be used to segregate processes and resources (e.g., memory, CPU processing power, and network resources) into relatively isolated virtual-environments called "containers."

Containers can be deployed from image files, which can be referred to as container images. A container image can be a static binary file that includes all of the requirements for running a container. For example, a container image can include the system libraries, tools, and settings required to deploy a container. The container image also includes metadata describing the container's needs and capabilities. This metadata is typically stored in a manifest file or image-index within the container image. Container images are generally compiled from layers (e.g., filesystem layers) built onto a parent or base image.

Containers are intended to be as lightweight as possible to enable fast deployment times. As a result, container images generally only have the minimal amount of content required for container deployment. Extraneous content is often removed from container images to improve download and deployment speeds.

DETAILED DESCRIPTION

Container images typically only have the minimum information required for container deployment, so that they are lightweight and rapidly deployed. But this limited information can make it difficult to determine how container images were created, which can be critical to reproducing, debugging, and validating the container images. For example, if a container has an error or is not deploying properly, it would be valuable to have more information related to the container image's creation in order to debug the problem. As another example, if an unknown container-image is to be deployed on a system, it would be valuable to have more information about the source and conditions of the container image's origin for security and validation purposes. But this information is lacking in traditional container-images.

Some examples of the present disclosure overcome one or more of the abovementioned problems by generating provenance data indicating at least one aspect of how a container image was created. An indicator of the provenance data can then be included in a metadata file of the container image, where the indicator can be the provenance data itself or a reference to a location from which the provenance data can be retrieved. The container image (with the modified metadata file) and the provenance data can then be stored in one or more repositories, such as a container registry. Thereafter, a client device can obtain the container image from a repository. If the client device has a problem deploying a container from the container image or otherwise needs more information related to the container image's generation, the client device can access the metadata file's indicator to obtain the provenance data. The client device may then use the provenance data to debug, replicate, or validate the container image.

As a particular example, a computing device can generate a container image for a webserver within a host environment. Part of generating the container image can involve creating a metadata file for the container image. The metadata file can include settings, layer information, and other information about the container image in a format capable of being consumed by a container engine (e.g., Docker®) to deploy the container. The computing device can also generate provenance data corresponding to the container image. The provenance data can include (i) commands issued to a build tool in order to generate the container image, (ii) debugging information resulting from generating the container image; (iii) characteristics of the host environment; (iv) information about another container image from which the container image was generated; (v) preserved context data from the time at which the container image was built including copied or added files; or (vi) any combination of these. The computing device can then modify the metadata file based on the provenance data. The computing device can modify the metadata file, rather than creating a new file within the container image, in order to maintain the structure of the container image. This may reduce the amount of extraneous files and prevent errors.

The computing device can modify the metadata by incorporating an indicator of the provenance data into the metadata. The indicator can have any suitable format. For example, the indicator can be in a format that is unknown to a container engine. These indicators can be referred to as unknown indicators. As one example, the indicator can include a Multipurpose Internet Mail Extensions (MIME) type that is not compliant with Open Containers Initiative (OCI) standards. Such unknown indicators may be ignored by a container engine when consuming the metadata file to deploy a container. For example, a container engine can be configured to ignore improperly formatted data in the metadata file to prevent errors and provide futureproofing. So, the container engine can ignore an unknown indicator that is in the metadata file. Other examples can involve indicators that are known to the container engine but specifically designated such that they are ignored by the container engine. These indicators can be referred to as known indicators. Either way, ignoring the indicator can prevent disruption and errors during deployment of the container resulting from the indicator's presence in the metadata file.

The indicator may include a reference to a location from which the provenance data can be obtained. Examples of the location can include a Universal Resource Locator (URL), an Internet Protocol (IP) address, or a memory address (e.g., in a content-addressable storage system). In some such examples, the computing device can determine the location and include the reference to the location in the metadata file as at least part of the indicator.

After modifying the metadata file, the computing device can cryptographically sign the metadata file (or another file that refers to the metadata file), in some examples. This can enable future users to validate the metadata file.

Finally, the computing device can upload the container image to a repository and the provenance data to the location, which may or may not also be the repository, such that the container image is stored independently of the provenance data. Storing the container image independently from the provenance data can keep the container image lightweight and quickly deployable, with the provenance data being available as needed.

After the container image and the provenance data have been uploaded, a client device can access the container registry and download the container image to deploy the webserver. But the client device may have problems deploying the webserver, or may wish to reproduce the container image. So, the client device can access the metadata file in the container image, determine the location from which the provenance data can be retrieved, and download the provenance data from that location. The client device can then use the provenance data to debug the webserver or reproduce the container image. For example, the client device can execute a tool that can consume the provenance data and automatically perform operations (e.g., debugging or reproducing the container image) based on the provenance data, with little or no input from a human user.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
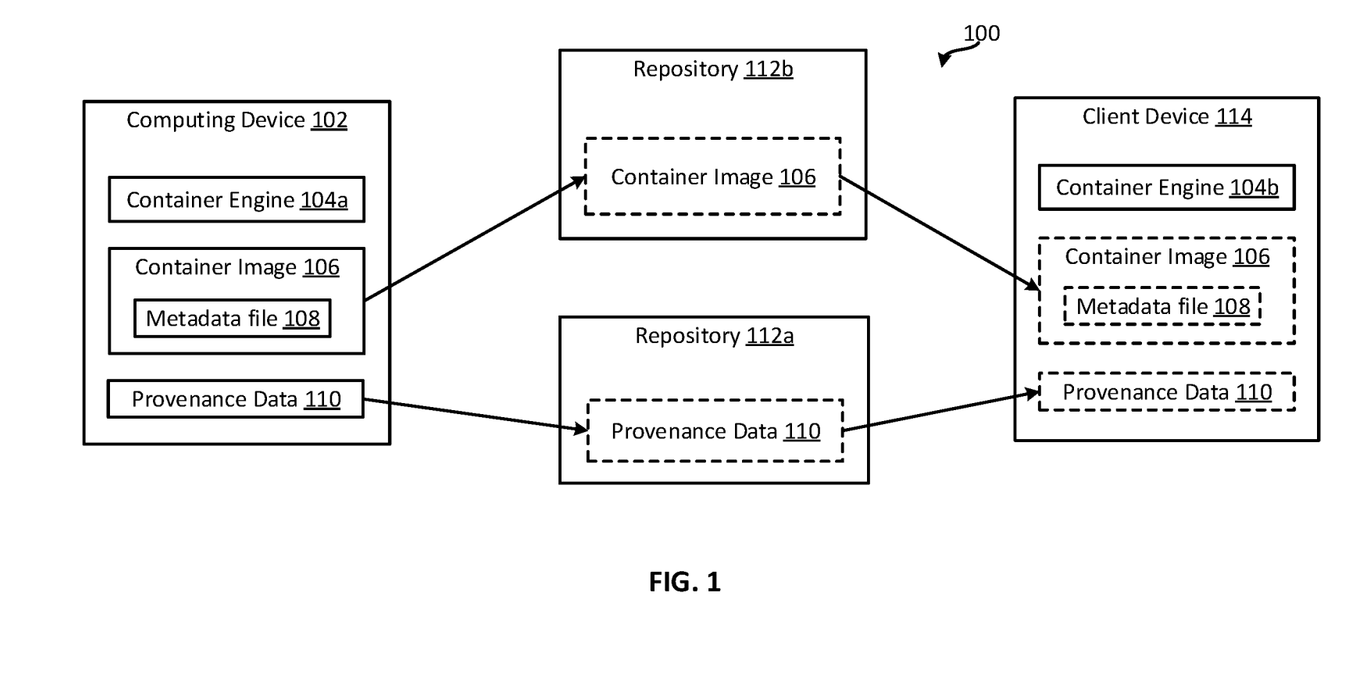
FIG. 1 is a block diagram of an example of a system for enabling container-image reproduction and debugging according to some aspects.

FIG. 1 is a block diagram of an example of a system 100 for enabling container-image reproduction and debugging according to some aspects. The system 100 includes a computing device 102, such as a server, node in a cloud environment, laptop computer, or desktop computer. The computing device 102 includes a container engine 104a for generating container images, deploying containers, or both. The computing device 102 can receive user input indicating that a container image is to be generated and responsively use the container engine 104a to generate a container image 106. The container image 106 can include a metadata file 108, such as a manifest file or an image-index file. The metadata file 108 can indicate settings, layer information, and other information about a container that is deployable from the container image 106.

In some examples, the computing device 102 can also generate provenance data. One example of the provenance data 110 can include information about another container image from which the container image 106 was generated. For example, the computing device 102 may generate the container image 106 from a base image (e.g., by starting with the base image and modifying the base image according to user-specified criteria). In some such examples, the provenance data 110 can include a name, version, digest, or any combination of these, corresponding to the base image. A digest can be a checksum representing a specific version of the base image at a particular instance in time. In some such examples, the computing device 102 can keep a record of the base image and any modifications thereto in order to generate the provenance data 110.

Another example of the provenance data 110 can include commands used to generate the container image 106. For example, the provenance data 110 can include Docker® commands or other commands issued to a build tool in order to build the container image 106. In some such examples, the computing device 102 can keep a record of the commands in order to generate the provenance data 110.

Yet another example of the provenance data 110 includes one or more characteristics of a host environment in which the container image 106 was generated. Examples of the one or more characteristics can include a filesystem type (e.g., EXT4 or XFS) of the host environment, a copy-on-write system (e.g., btrFS, overlyFS, or AUFS) of the host environment, an operating system of the host environment, a host name corresponding to the host environment, a kernel version of the host environment, a security framework (e.g., AppArmor) of the host environment, a container-runtime tool (e.g., runC or Kata Containers) of the host environment, a working directory in the host environment in which the container image 106 was generated, or any combination of these. In some examples, the host environment can be on the computing device 102, and the computing device 102 can determine the characteristics of the host environment by analyzing itself. In other examples, the container image 106 may have been built by a server that is remotely controlled by the computing device 102. In some such examples, the computing device 102 can communicate with the server to determine the characteristics of the host environment on the server.

Another example of the provenance data 110 can include debugging information. The debugging information can be obtained from the computing device's kernel, the container engine 104a, or both. The debugging information can be generated as a result of the container image 106 being created. In some examples, the debugging information can include relationships between the container image and source code from which the container image was generated (e.g., relationships between aspects of the container image and source-code lines, variable names, etc.).

Still another example of the provenance data 110 can include one or more files permanently or ephemerally incorporated into the container image 106 while the container engine 104a is generating the container image 106. For example, some files may only be included in the container engine 104a while the container engine 104a is building the container image 106, and then subsequently removed. In some such examples, the provenance data 110 can indicate that such files were included during the build process and then subsequently removed.

The provenance data 110 can include textual data, a file (e.g., an archive file, such as a TAR archive), multiple files, or any combination of these. For example, a pristine copy of the buildroot used to build the container image 106 can be stored as an archive file and used as at least a portion of the provenance data 110. As another example, part of the build process may include fetching an object from a repository and including the object either permanently or ephemerally into the container image 106. In some such examples, the computing device 102 can store a pristine copy of the object in an archive file for use as another portion of the provenance data 110. The computing device 102 can further include debugging information as another portion of the provenance data 110. The provenance data 110 can include any amount and type of information, including combinations of the information discussed above.

After generating the provenance data 110, the computing device 102 can modify a metadata file 108 (created with the container image 106) based on the provenance data 110. For example, the computing device 102 can include at least some of the provenance data 110 directly into the metadata file 108. Additionally or alternatively, the computing device 102 can determine one or more locations from which at least a portion of the provenance data 110 will be obtainable. In some examples, the computing device 102 can determine the one or more locations by receiving the location(s) as user input. Alternatively, the computing device 102 can be pre-programmed with the location(s) as a default setting. Alternatively, the computing device 102 communicate with one or more servers to determine which of the servers have availability of the provenance data 110, and then use one or more available servers as the location(s). After determining the one or more locations, the computing device 102 can modify the metadata file 108 to include one or more references to the one or more locations.

Figure 2:
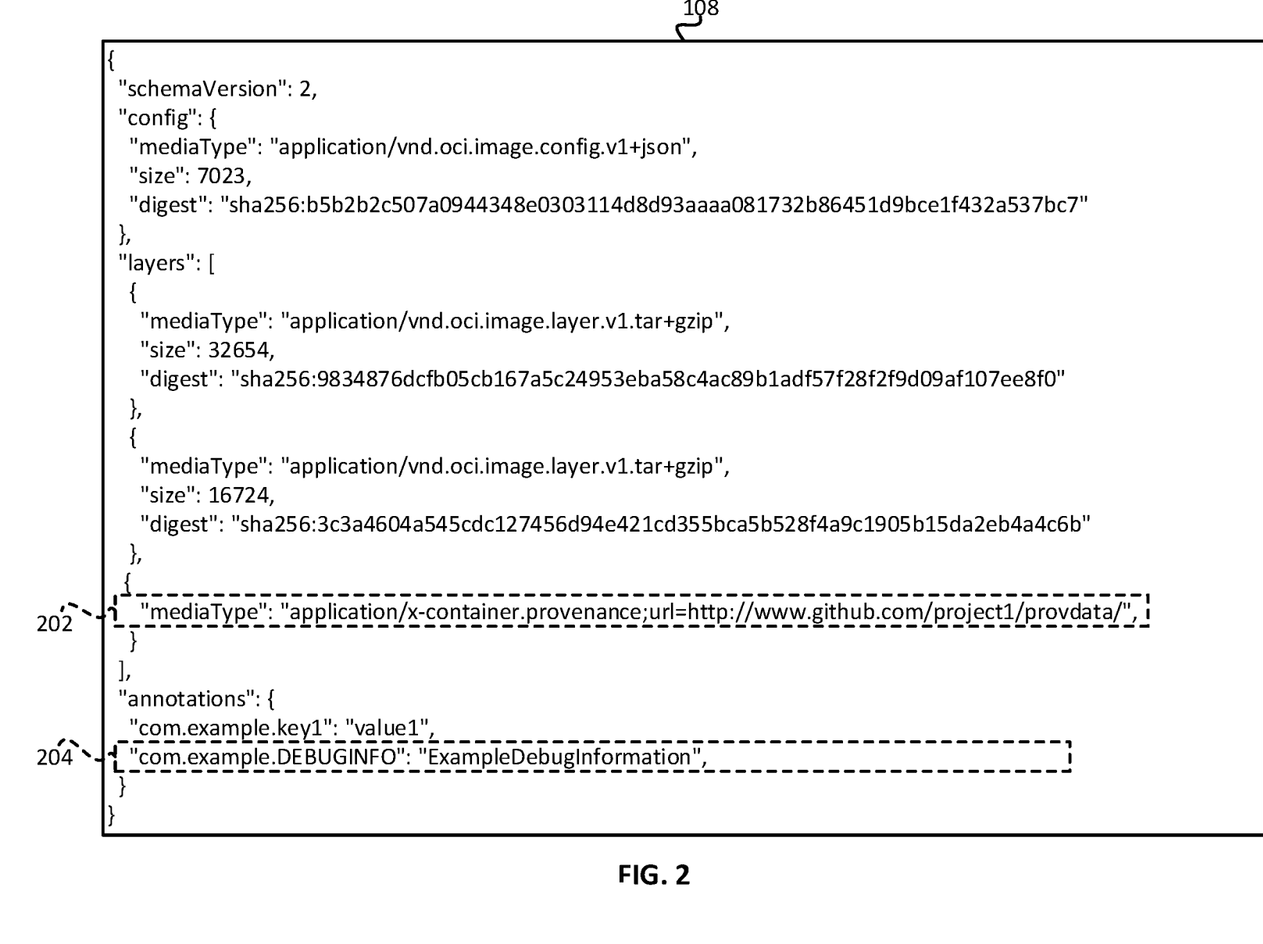
FIG. 2 is an example of metadata in a metadata file according to some aspects.

One example of metadata in the metadata file 108 is shown in FIG. 2. In this example, the metadata is in a JavaScript Object Notation (JSON) format. But in other examples, the metadata can be in another format. The metadata first includes general configuration settings for the container image, then layer information about each layer in the container image, and then finally annotations with key-value pairs. In FIG. 2, indicators 202, 204 of the provenance data are shown in dashed boxes. Indicator 202 is denoted using an unknown MIME-type (e.g., a MIME-type that does not conform to OCI standards). Specifically, the indicator 202 is denoted using the mediaType "application/x-container.provenance," which does not conform to OCI standards, and which indicates that at least some of the provenance data is available at the URL "http://www. github.com/project1/provdata/." Indicator 204 is denoted using the annotation "com.example.DEBUGINFO," which may or may not conform to OCI standards but, either way, may be ignored by container engines. This annotation may express that debugging information is available. The indicator 204 also has the corresponding debugging information (e.g., "ExampleDebugInformation"). While FIG. 2 shows the indicators 202, 204 in specific locations within the metadata, in other examples the indicators 202, 204 can be positioned in any suitable location in the metadata.

Referring back to FIG. 1, in this example the computing device 102 has determined that at least a portion of the provenance data 110 is to be stored in repository 112a. So, the computing device 102 can include a reference to repository 112a in the metadata file 108. In some examples, the computing device 102 can also cryptographically sign the metadata file 108 (or another file that refers to the metadata file 108). For example, after modifying the metadata file 108 to include the indicator(s) of the provenance data 110, the computing device 102 can cryptographically sign the metadata file 108. Additionally or alternatively, the computing device 102 can cryptographically sign another file that is in a cryptographic chain (e.g., a Merkle tree) with the metadata file 108. This can enable future users to validate the metadata file 108.

The computing device 102 can then upload a copy of the provenance data 110 to the repository 112a and a copy of the container image 106 to repository 112b, which may be a container registry. Alternatively, the computing device 102 can upload copies of the provenance data 110 and the container image 106 to the same repository (e.g., if the provenance data 110 is entirely or partially included in the metadata file 108 of the container image 106).

In some examples, a client device 114 may subsequently obtain a copy of the container image 106 from the repository 112b. The client device 114 can have its own container engine 104b from which it can deploy a container using its copy of the container image 106. In some examples, the client device 114 can also retrieve provenance data 110 corresponding to the container image 106. For example, the client device 114 can access a copy of the metadata file 108 in the container image 106, determine that the provenance data 110 is available based on the indicator in the metadata file 108, and retrieve the provenance data 110. If the provenance data 110 is directly included in the metadata file 108, the client device 114 can retrieve the provenance data 110 by extracting it from the metadata file 108. If the provenance data is additionally or alternatively at a remote location (e.g., repository 112a), the client device 114 can retrieve the provenance data 110 by obtaining it from the remote location. This may involve, for example, downloading archive files or other objects from the remote location that collectively form at least some of the provenance data 110. Once the client device 114 has the provenance data 110, the client device 114 can debug the container image 106, reproduce the container image 106, validate or perform another security test on the container image 106, or any combination of these.

Figure 3:
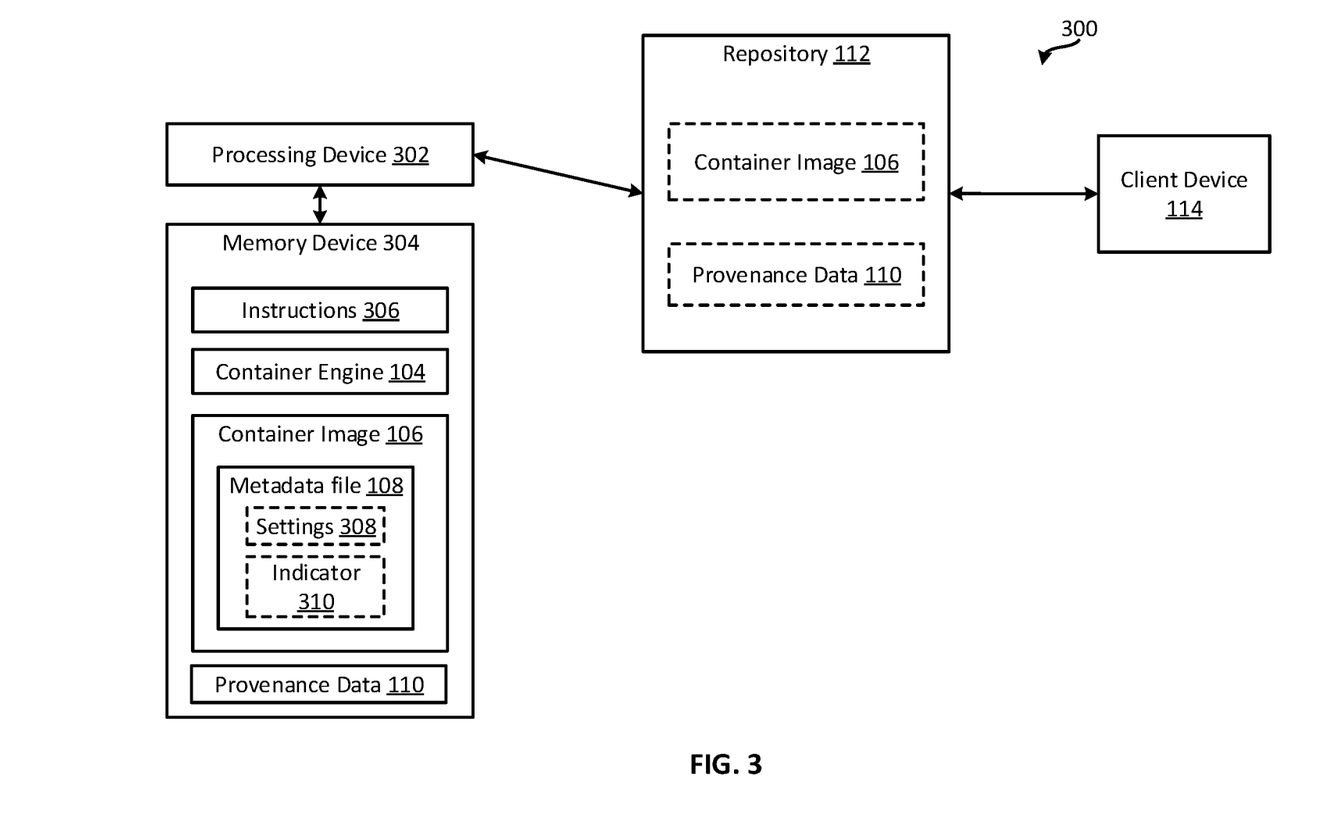
FIG. 3 is a block diagram of another example of a system for enabling container-image reproduction and debugging according to some aspects.

FIG. 3 is a block diagram of another example of a system 300 for enabling container-image reproduction and debugging according to some aspects. The system 300 includes a processing device 302 communicatively coupled with a memory device 304. The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processing device 302 can generate a container image 106 that includes a metadata file 108 that is consumable by a container engine 104. The metadata file 108 can be consumed by the container engine 104 in order to deploy a container with settings 308 or other features specified in the metadata file 108. The processing device 302 can also generate provenance data 110 indicating at least one aspect related to the generation of the container image. For example, the provenance data 110 can indicate at least one aspect of how the container image 106 was generated. Additionally or alternatively, the provenance data 110 can indicate when the container image 106 was generated. The processing device 302 can generate the provenance data 110 independently of the container image 106 and the metadata file 108.

The processing device 302 can modify the metadata file 108 in the container image 106 to include an indicator 310 of the provenance data 110. The processing device 302 can then store the container image 106 and the provenance data 110 in repository 112, which may represent one repository or multiple repositories. The repository 112 can be accessible to a client device 114.

In some examples, the processing device 302 can divide up the provenance data 110 and store portions of the provenance data 110 in multiple repositories, from which some or all of the portions can be downloaded by the client device 114. Alternatively, the processing device 302 can store all of the provenance data 110 in a single repository.

Figure 4:
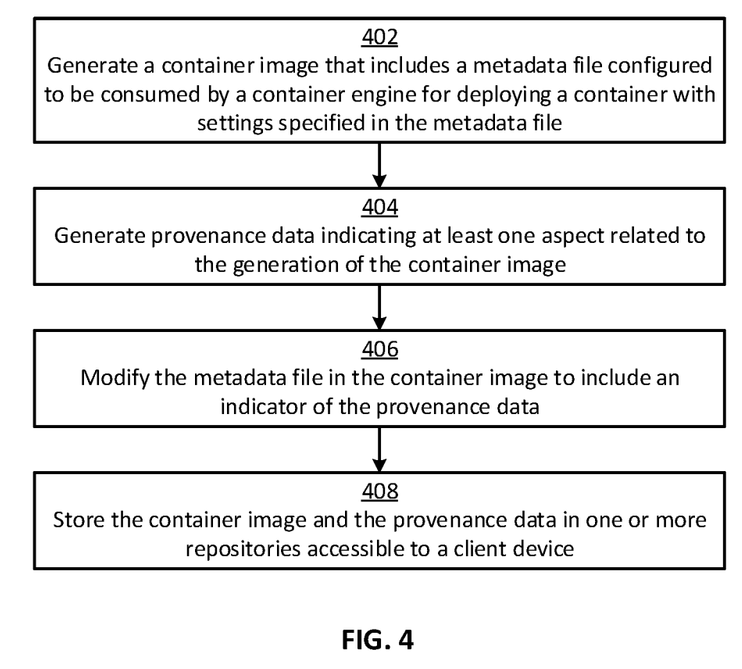
FIG. 4 is a flow chart of an example of a process for enabling container-image reproduction and debugging according to some aspects.

In some examples, the processing device 302 can implement some or all of the steps shown in FIG. 4. Other examples can include more steps, fewer steps, different steps, or a different combination of steps than are shown in FIG. 4. The steps of FIG. 4 are discussed below with reference to the components discussed above in relation to FIG. 3.

In block 402, the processing device 302 generates a container image 106 that includes a metadata file 108 configured to be consumed by a container engine 104 for deploying a container with settings 308 specified in the metadata file 108. The processing device 302 can generate the container image 106 using the container engine 104. The output from the container engine 104 can be the container image 106 with the metadata file 108.

In block 404, the processing device 302 generates provenance data 110 indicating at least one aspect of related to the generation of the container image 106. The processing device 302 can generate the provenance data 110 independently of the metadata file 108. For example, the processing device 302 can generate the provenance data subsequent to generating the metadata file 108. And the provenance data 110 can be different (e.g., entirely different) from the metadata in the metadata file 108.

In some examples, the processing device 302 can generate the provenance data 110 at least in part by analyzing one or more characteristics of a host environment in which the container image 106 was generated. Additionally or alternatively, the processing device 302 can generate the provenance data 110 at least in part by maintaining a record of commands and files used to generate the container image 106.

In block 406, the processing device 302 modifies the metadata file 108 in the container image 106 to include an indicator 310 of the provenance data 110. The indicator 310 can include the provenance data 110 or a reference to a location from which the provenance data 110 can be obtained by a client device 114. Modifying the metadata file 108 can include incorporating adding data into the metadata file 108, replacing data in the metadata file 108, or deleting data from the metadata file 108. In some examples, the processing device 302 can modify the metadata file 108 in such a way that the indicator is ignored by the container engine 104 at runtime.

In block 408, the processing device 302 stores the container image 106 and the provenance data 110 in one or more repositories 112 that are accessible to a client device 114. This may involve the processing device 302 uploading the container image 106 to a repository 112, whereby the container image 106 includes the metadata file 108, which in turn includes at least some of the provenance data 110. Additionally or alternatively, this may involve the processing device 302 uploading at least some of the provenance data 110 independently of the container image 106 to a repository (e.g., which may be the same as, or different from, the repository 112 in which the container image 106 is stored).

While the above examples involve modifying an existing metadata file 108 in the container image 106 to include the indicator 310 of the provenance data 110, other examples can involve other approaches. For example, the processing device 302 can create a new metadata-file within the container image 106 and incorporate the indicator 310 of the provenance data 110 into the new metadata-file, rather than modifying the existing metadata file 108 initially generated along with the container image 106. But this may increase the size of the container image 106 and modify the structure of the container image 106. As another example, the processing device 302 can communicate the indicator 310 of the provenance data 110 to a sever (e.g., associated with the repository 112), which can store an association between the indicator 310 and the container image 106. Thereafter, a client device 114 can query the server to determine if the container image 106 has a corresponding indicator 310 and, if so, retrieve the indicator 310. The client device 114 can then use the indicator 310 to obtain the provenance data 110 (e.g., as discussed above).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A non-transitory computer-readable medium comprising program code that is executable by a processing device for causing the processing device to:
   access a container image that includes a metadata file having settings to be extracted by a container engine for configuring a container;
   generate a modified container image by modifying the metadata file in the container image to include an indicator of provenance data associated with the container image; and
   store the modified container image in a repository.

2. The non-transitory computer-readable medium of claim 1, further comprising program code that is executable by the processing device for causing the processing device to generate the container image.

3. The non-transitory computer-readable medium of claim 1, wherein the metadata file is a manifest file of the container image.

4. The non-transitory computer-readable medium of claim 1, wherein the settings are specified in the metadata file in a first format, and wherein the indicator is specified in the metadata file in a second format that is different from the first format.

5. The non-transitory computer-readable medium of claim 1, wherein the indicator includes the provenance data.

6. The non-transitory computer-readable medium of claim 1, wherein the indicator is separate from the provenance data and indicates a location from which the provenance data is obtainable, the location being external to the container image.

7. The non-transitory computer-readable medium of claim 1, wherein the provenance data includes information about another container image from which the container image was generated.

8. The non-transitory computer-readable medium of claim 1, wherein the provenance data includes one or more characteristics of a system environment in which the container image was generated.

9. The non-transitory computer-readable medium of claim 1, wherein the provenance data includes debugging information resulting from generating the container image.

10. The non-transitory computer-readable medium of claim 1, further comprising program code that is executable by the processing device for causing the processing device to cryptographically sign the metadata file or another file that refers to the metadata file.

11. The non-transitory computer-readable medium of claim 1, wherein the indicator is configured to be ignored by the container engine when deploying the container.

12. The non-transitory computer-readable medium of claim 1, wherein the indicator includes a Multipurpose Internet Mail Extensions (MIME) type that is not compliant with Open Container Initiative (OCI) standards.

13. The non-transitory computer-readable medium of claim 1, wherein the provenance data is generated subsequently to, and independently of, the metadata file being generated.

14. A method comprising:
  accessing, by a processing device, a container image that includes a metadata file having settings for a container, the metadata file being formatted for use by a container engine in deploying a container having the settings in a computing environment, the container engine being configured to extract the settings from the metadata file and deploy a corresponding container having the settings in the computing environment;
  generating, by the processing device, a modified container image by modifying the metadata file to include an indicator of provenance data associated with the container image; and
  storing, by the processing device, the modified container image in a repository.

15. The method of claim 14, further comprising generating the container image.

16. The method of claim 14, wherein the metadata file is a manifest file of the container image.

17. The method of claim 14, wherein the settings are specified in the metadata file in a first format, and wherein the indicator is specified in the metadata file in a second format that is different from the first format and that is configured to be ignored by the container engine when deploying the container.

18. The method of claim 14, wherein the indicator is separate from the provenance data and indicates a location from which the provenance data is obtainable, the location being external to the container image.

19. The method of claim 14, wherein the provenance data is generated subsequently to, and independently of, the metadata file being generated.

20. A system comprising:
  a processing device; and
  a memory device that includes instructions executable by the processing device for causing the processing device to:
    access a container image that includes a metadata file having settings for a container, the metadata file being formatted for use by a container engine in deploying a container having the settings in a computing environment, the container engine being configured to extract the settings from the metadata file and deploy a corresponding container having the settings in the computing environment;
    generate a modified container image by modifying the metadata file to include an indicator of provenance data associated with the container image; and
    store the modified container image in a repository.

* * * * *